July 1, 1958 A. ABATE 2,841,334

COUNT TRANSFERRING DEVICES

Filed April 22, 1953 2 Sheets-Sheet 1

INVENTOR
ANTHONY ABATE
BY Elmer J. Gorn
ATTORNEY

July 1, 1958 A. ABATE 2,841,334

COUNT TRANSFERRING DEVICES

Filed April 22, 1953 2 Sheets-Sheet 2

INVENTOR
ANTHONY ABATE
BY Elmer J. Gorn
ATTORNEY

United States Patent Office 2,841,334

Patented July 1, 1958

2,841,334

COUNT TRANSFERRING DEVICES

Anthony Abate, Waltham, Mass., assignor to Raytheon Manufacturing Company, Newton, Mass., a corporation of Delaware Application April 22, 1953, Serial No. 350,283

4 Claims. (Cl. 235—92)

Figure 1:
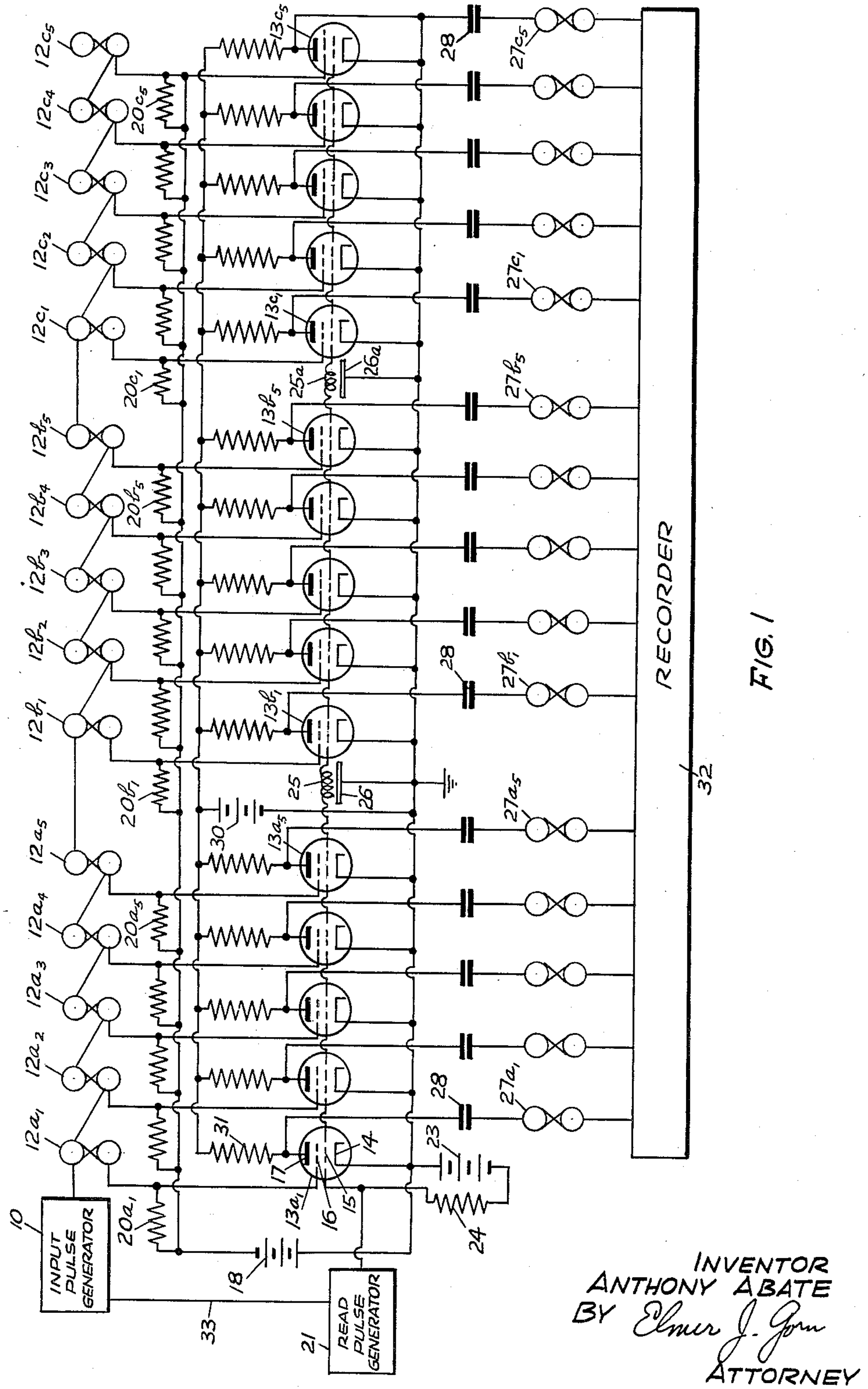

This invention relates to devices for transferring the condition of a counter to a register or recording device, and more particularly to devices of this type in which the counter has many stages and the device transfers the condition at a particular instant without upsetting the operation of the counter.

In computers, telemeters, and communication systems, it is frequently desirable to use a binary counter having a capacity for a count of many digits with facilities for transferring the count at a particular instant to a register or other device without upsetting the counting operation. This can be done by triggering open gate circuits, one associated with each stage of the counter simultaneously, at the end of a counting cycle. This necessitates making the operation of the counter fast enough so that the travel time through the counter of a train of pulses to be counted is sufficiently less than the counting pulse period, to permit a read-out without interfering with the operation of the counter. It is apparent that this requirement necessitates a circuit that may have a much more rapid counting rate than is needed for the phenomena to be counted. For example, in the case of a 25-digit binary counter, designed to count pulses 4 microseconds apart and to be sampled 16 times a second, a counting rate of 5 megacycles is required to give sufficient resolution to prevent the reading operation from interfering with the operation of the counter. Such a rapid counter is more expensive to construct than one having a slower counting rate.

The necessity of such a fast counting rate, in order to permit a certain reading rate, is obviated by the circuits of the present invention. This is accomplished by providing means for transferring the count progressively as it proceeds down the counter chain, rather than waiting until all the stages of the counter are filled. In the case of the 25-digit counter, mentioned above, if a travel time of 3 microseconds per 5 digits, or a total of 15 microseconds for 25 digits, is assumed, this can be accomplished by applying the reading pulse to the gates associated with the counting stages representing groups of 5 digits at intervals of 3 microseconds. With this system, a counting rate of only 250,000 per second can be used as against the almost prohibitive rate of 5 million counts per second of the conventional system of reading out from a counter. The counter is read in groups of stages by connecting the reading pulse to one group of gates directly to the next group of gates through a line introducing a delay greater than the transit time of the pulses to be counted through a group of counter stages and to successive stages of gates through additional sections of delay line to introduce additional equal delays, so that the count is gated through to the register or other device as soon as it has passed through each successive group of stages.

Figures 2A, 2B, 3A, 3B, 4A, 4B:
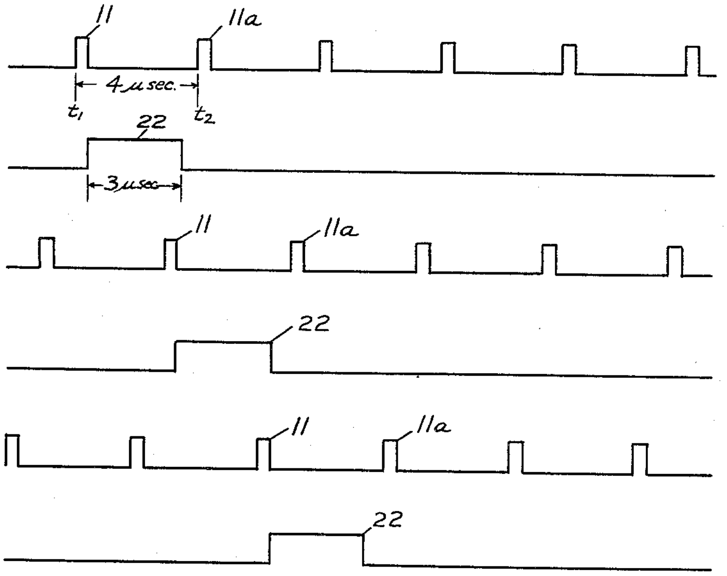

The foregoing and other features of the invention will become more apparent from the following description taken in connection with the accompanying drawings, wherein:

Fig. 1 is a schematic view of an embodiment of the invention for transferring the state of a counter to a recorder;

Fig. 2*a* is a voltage time diagram of the pulses to be counted as they appear at the input to the counter;

Fig. 2*b* is a voltage time diagram of the reading pulse as it appears at the first group of gates;

Fig. 3*a* is a voltage time diagram of the counter pulses as they appear at the input to the second group of counter stages;

Fig. 3*b* is a voltage time diagram of the reading pulse as it appears at the second group of gates;

Fig. 4*a* is a voltage time diagram of the counter pulses as they appear at the third group of counter stages; and Fig. 4*b* is a voltage time diagram of the reading pulse as it appears at the third group of gates.

The invention is illustrated as applied to a 15-digit counter divided into three groups of 5 digits each. It will be apparent that the principles of the invention can be applied to a counter having any number of stages, and divided into groups of as many stages as desired with appropriate time delays introduced between the groups of gates.

In Fig. 1, reference numeral 10 designates a source of positive-going pulses to be counted having the wave form 11, shown in Fig. 2*a*. Two successive such pulses 11 and 11*a* are separated by an interval $t_2—t_1$ which, for the purposes of illustration, will be taken as 4 microseconds. These pulses 11 are applied to the input of a counter stage 12, which may be a multivibrator of any of the well-known types represented in the drawings by two circles connected by crossed lines for the sake of simplicity. These counter stages are arranged in three groups of 5 stages each. For convenience, the group to which a stage belongs is designated by a letter *a, b,* or *c,* and the position of a counter stage within its group is designated by numerals 1 to 5 positioned below the line. For instance, 12$a_1$ designates the first counter stage in the first counter group, and 12$c_5$ designates the last counter stage in the last counter group. Each counter stage 12 has associated with it a coincidence gating tube 13 similarly arranged in groups of five, and designated as to group and position within the group by a letter for the group and a subnumeral for the position, as in the case of the counter stages. For example, gate 13$a_1$ designates the first gate in the first group. Each coincidence gating tube 13 has a cathode 14, a grid 15, a screen grid 16, and a plate 17. The output of each counter stage 12 is coupled to the screen grid 16 of its associated gating tube 13 and to a source 18 of negative potential through a resistor 20. Each of the grids 15 is connected to a source 21 of reading pulses of the form 22, shown in Fig. 2*b*, and to a source 23 of negative potential through a resistor 24. These pulses 22 have a duration somewhat less than the interval between the pulses to be counted, and equal to the time required for a pulse to travel through a group of counter stages. This duration is shown in Fig. 2*b* as 3 microseconds, as compared with the 4-microseconds intervals between the pulses to be counted. It will be seen in Fig. 1 that the grids 15 of coincidence gating tubes 13$a_1$ through 13$a_5$ are connected directly to the source 21 of reading pulses, and that the grids 15 of the second group of gating pulses 13$b_1$ through 13$b_5$ are connected to the source 21 of reading pulses through a time-delay circuit comprising an inductance 25 and a distributed capacitance represented by the capacitor 26. This delay is made equal to the time required for the count to pass through a group of counting stages, in this case 3 microseconds. Similarly, the grids 15 of the third group of gates 13$c_1$ through 13$c_5$ are connected to the reading pulse generator 21 through this first delay line and a second delay line also comprising an inductor 25*a* and a capacitor 26*a*, which introduces an additional delay of 3 microseconds. The plate 17 of each gate $13a_1$ through $13c_5$ is coupled to the input of an associated register stage 27, similarly numbered $27a_1$ through $27c_5$, through a capacitor 28 and to a source of positive potential 30 through a resistor 31. The output of each register stage 27 may be, as shown in Fig. 1, connected to a recorder 32. The recorder may be a magnetic tape recorder of the type shown in Fig. 1 of United States patent, No. 2,616,965, issued to C. H. Hoeppner, an indicator, a second register, or counter, as desired.

In operation, the train of pulses 11 from the generator 10 is applied to the counter stages $12a_1$, through $12c_5$. It takes an appreciable time for the first of these pulses to travel through the first group of 5 counter stages. In the example used for illustration, this time is taken to be 3 microseconds. In this example, the time between pulses to be counted is 4 microseconds for a counting rate of 250,000 counts per second. It will be seen that the passage time of the pulse 11 through the first 5 counters, $12a_1$ through $12a_5$, is appreciably less than this pulse interval. The state of a counter stage $12a_1$ through $12a_5$ determines the potential at the screen grid 16 of its associated coincidence gate 13; that is, when the counting stage registers a count, a sufficiently positive potential is applied to the grid 16 to overcome the fixed negative bias from the source 18. Any counting pulse may be used to trigger the source of reading pulses 21 over the line 33 to generate a pulse of a duration of 3 microseconds. The positive voltage of this pulse 22 is sufficient in amplitude to overcome the negative potential on the grid 15 from the source 23 of any coincidence gate to which it is applied. Thus, any stage of the counter showing a count will set up conditions in its associated coincidence gating tube 13 to permit it to conduct for the duration of a reading pulse 22 applied to its control grid 15. The effect of the 3-microseconds delay lines between successive groups of coincidence gates is to prevent a reading pulse from reaching a group of coincidence gates before the count is completed in the corresponding group of counting stages. This is best seen in Figs. 2*a*, 2*b*, 3*a*, 3*b*, 4*a*, and 4*b* where Fig. 2*a* represents the conditions in the counting group *a*, Fig. 2*b* represents the conditions in the coincidence gating tube group *a*, Fig. 3*a* the conditions in the counting group *b* and Fig. 3*b* those in the corresponding coincidence gating tube group, Fig. 4*a* the conditions in the counting group *c* and Fig. 4*b* those in the corresponding coincidence gating tube group. When a counting pulse occurs, it is applied to the reading pulse generator 21 over line 33 as well as to the counting group *a*. This permits the reading pulse generator 21 to be triggered on to produce a reading pulse 22 to open the coincidence gates associated with each counting stage in the first group that is recording a count. The result is to transfer this count to the associated register stage 27 which, in turn, actuates the associated element of the recorder 32. The gates of this group are open for the 3 microseconds that it takes the count to travel through the next group of counter stages 12*b* and close before the next count pulse 11 reaches the first group. At this time, the reading pulse 22 reaches the associated group *b* of gates 13, through the delay line 25—26, opening them to permit the count to be transferred to the second group *b* of the register 27 before the next count arrives. Similarly, 6 microseconds later, the reading pulse 22 reaches the associated group of gates 13*c*, associated with counters 12*c*, opening them and permitting the count to be transferred to the third group 27*c* of registers before the next count occurs. This timing prevents the counting operation of the chain of counters 12 from being interfered with. It is desirable that the reading pulse reach the next group of gates while the preceding group is still open. By this method, the count contained in a counter can be transferred to a register or recorder at any time, immediately following occurrence of a counting pulse, without interfering with the counting operation and without requiring an individual pulse to pass completely through the chain before the next pulse to be counted occurs.

It can be seen that the principle of this invention can be used with appropriate adjustments for any counter having any desired pulse repetition rate and having as many stages as desired by providing delay lines between the grids of any number of gating tubes associated with any desired number of counting tubes arranged in groups if the delay introduced by the delay line is equal to the time required for a count to progress through the number of counters in such a group and is less than the interval between the pulses to be counted. The duration of the reading pulse is made equal to this time delay.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A binary counter comprising a plurality of stages each representing a digit, arranged in groups, a plurality of gating circuits each associated with the output of a stage of the counter, a plurality of output devices each associated with the output of a gating circuit, a source of gating pulses connected directly to each gating stage in the first group and to gating stages in subsequent groups through successive means each adapted to delay the gating pulse by an amount somewhat less than the interval between input pulses to the counter and equal to the time required for a count to pass through a group of counter stages.

2. A binary counter comprising a plurality of stages each representing a digit, arranged in groups, a plurality of gating circuits each associated with the output of a stage of the counter, a plurality of output devices each associated with the output of a gating circuit, a source of gating pulses connected directly to each gating stage in the first group and to gating stages in subsequent groups through successive electrical delay lines each adapted to delay the gating pulse by an amount somewhat less than the interval between input pulses to the counter and equal to the time required for a count to pass through a group of counter stages.

3. A binary counter comprising a source of input pulses, a plurality of stages each representing a digit, arranged in groups, a plurality of gating circuits one for each stage of the counter and comprising an electron discharge device having a cathode, first and second grids and an anode, a plurality of output devices each connected in the plate circuit of a gating device, means to couple each counter stage to the first grid of the associated gating device, a source of gating pulses connected directly to the second grid of each gating device in the first group and to gating devices in subsequent groups through successive means each adapted to delay the gating pulse by an amount somewhat less than the interval between input pulses to the counter and equal to the time required for a count to pass through a group of counter stages.

4. A binary counter comprising a source of input pulses, a plurality of stages each representing a digit, arranged in groups, a plurality of gating circuits one for each stage of the counter and comprising an electron discharge device having a cathode, first and second grids and an anode, a plurality of output devices each connected in the plate circuit of a gating device, means to couple each counter stage to the first grid of the associated gating device, a source of gating pulses connected directly to the second grid of each gating device in the first group and to gating devices in subsequent groups through successive electrical delay lines each adapted to delay the gating pulse by an amount somewhat less than the interval between input pulses to the counter and equal to the time required for a count to pass through a group of counter stages.

References Cited in the file of this patent

UNITED STATES PATENTS

| | | |
|---|---|---|
| 2,404,739 | Mumma | July 23, 1946 |
| 2,426,454 | Johnson | Aug. 26, 1947 |
| 2,528,394 | Sharpless et al. | Oct. 31, 1950 |
| 2,542,021 | Fox | Feb. 20, 1951 |
| 2,594,731 | Connolly | Apr. 29, 1952 |
| 2,623,171 | Woods-Hill et al. | Dec. 23, 1952 |
| 2,642,493 | Locke et al. | June 16, 1953 |

OTHER REFERENCES

"A Digital Computer for Scientific Applications," by West and DeTurk, Proceedings of IRE, December 1948, page 1456, Figure 8.